United States Patent [19]
Yokoyama et al.

[11] Patent Number: 5,960,919
[45] Date of Patent: Oct. 5, 1999

[54] AUTOMATIC TRANSMISSION WITH A SEPARATOR FOR REMOVING OIL FROM THE SURFACE OF A ROTARY MEMBER

[75] Inventors: Fumitomo Yokoyama; Kazuhisa Ozaki, both of Aichi-ken; Akihiro Kuroyanagi, Okazaki; Makoto Hijikata, Toyota; Katsuyuki Asaoka, Nishio; Akihito Hongoya, Anjo; Kagenori Fukumura, Toyota; Atsushi Tabata, Okazaki; Yasuo Hojo, Nagoya, all of Japan

[73] Assignees: Aisin AW Co., Ltd.; Toyota Jidosha Kabushiki Kaisha, both of Japan

[21] Appl. No.: 08/880,919

[22] Filed: Jun. 23, 1997

[30] Foreign Application Priority Data

Jul. 16, 1996 [JP] Japan .................................. 8-186382

[51] Int. Cl.⁶ .................................................. F16D 13/74
[52] U.S. Cl. .................................. 192/70.12; 192/113.34; 74/467; 74/606 R
[58] Field of Search ............................ 192/70.12, 85 AA, 192/113.3, 113.34, 30 W; 74/467, 606 R

[56] References Cited

U.S. PATENT DOCUMENTS

| | | | |
|---|---|---|---|
| 1,554,081 | 9/1925 | Garrett | 74/467 |
| 3,659,668 | 5/1972 | Ross et al. | 192/113.34 X |
| 3,661,238 | 5/1972 | Davies | 192/70.12 X |
| 4,091,905 | 5/1978 | Sieren et al. | 192/113.34 |
| 4,098,143 | 7/1978 | Kubo et al. | 74/606 R |
| 4,624,353 | 11/1986 | Sailer et al. | 192/70.12 |
| 4,730,514 | 3/1988 | Shikata et al. | 192/70.12 X |
| 5,176,039 | 1/1993 | Takeuchi et al. | 74/467 |
| 5,251,725 | 10/1993 | Barrett, Jr. | 74/467 X |
| 5,269,201 | 12/1993 | Uematsu | 192/30 W X |
| 5,467,667 | 11/1995 | Zaiser et al. | 74/606 R |
| 5,706,694 | 1/1998 | Bhookmohan et al. | 192/70.12 X |
| 5,755,314 | 5/1998 | Kanda et al. | 192/70.12 |

FOREIGN PATENT DOCUMENTS 6213303   8/1994   Japan .

Primary Examiner—Charles A Marmor
Assistant Examiner—Scott Lund

[57] ABSTRACT

An automatic transmission including at least one rotary member; a rotary member enclosure enclosing the rotary member; and an oil reservoir arranged below the rotary member enclosure for collecting and reserving the oil. An oil separator is located facing the outer circumference of the rotary member for separating the oil adhering to the rotary member. Because the amount of oil left on the surface of the rotary member is reduced, the amount of oil recovered in the oil reservoir is accordingly increased and the level of the oil surface in the oil reservoir is prevented from falling.

5 Claims, 4 Drawing Sheets

AUTOMATIC TRANSMISSION WITH A SEPARATOR FOR REMOVING OIL FROM THE SURFACE OF A ROTARY MEMBER

BACKGROUND OF THE INVENTION

1. Field of the Invention

The invention relates to an automatic transmission.

2. Description of the Related Art

In the automatic transmission of the prior art, the rotation as generated by an engine is transmitted through a torque converter to a speed change unit and the speed-changed rotation is transmitted to drive wheels. The speed change unit is equipped with a gear unit composed of a plurality of gear elements for establishing a plurality of gear stages by applying/releasing frictional engagement elements including clutches and brakes for selective output of the rotation of the gear elements.

In order to lubricate and cool the rotary elements such as the gear elements and bearings, an oil pan provides an oil reservoir below the casing of the automatic transmission from which oil is taken up by an oil pump and fed to the individual rotary members. The oil, having lubricated and cooled the rotary members, is scattered by centrifugal force and then drops by gravity and is recovered in the oil pan.

In the automatic transmission of the prior art, however, the number of rotary members is extremely increased if a plurality of gear units are arranged in the automatic transmission casing to provide multiple stages, so that the amount of oil required to be fed to the individual rotary members is accordingly increased.

When the oil becomes more viscous and less fluid at a low temperature, the level of oil is lowered in the oil pan because the oil is left adhering to the surfaces of the rotary members, in spite of the centrifugal force, so that the amount of oil recovered in oil pan is accordingly reduced. While it is conceivable to reserve a greater amount of oil in the oil pan, such an approach would not only raise the cost but would also cause loss of the lubricity of the oil itself to lower the efficiency of the automatic transmission. If the oil is degraded or aerated, moreover, its lubricating and cooling capabilities decline.

SUMMARY OF THE INVENTION

Accordingly, the present invention seeks to solve the aforementioned problems of the automatic transmission of the prior art and has as its object provision of an automatic transmission with an increased amount of oil recovered in its oil reservoir and which prevents the level of the oil surface from excessively lowering in the oil reservoir.

Accordingly, the present invention provides an automatic transmission comprising: at least one rotary member; a rotary member enclosure enclosing the rotary member; an oil reservoir arranged below the rotary member enclosure for containing a reservoir of the oil; and oil separating means facing the outer circumference of the rotary member for contacting and removing the oil adhering to the rotary member.

In a preferred embodiment of the invention, the oil separating means deflects the flow of the oil, removed from the outer circumference of the rotary member, radially outward.

In another preferred embodiment of the invention, the rotary member enclosure has a hole providing communication between the interior of the transmission case and the oil reservoir.

In yet another preferred embodiment of the invention, the oil separating means includes a plurality of axially extending oil grooves formed in the inner circumferential surface of the rotary member enclosure, and a plurality of ridges formed between the grooves. The axially extending edges of the ridges, located on the downstream side of the ridges in the direction of rotation of the rotary member, are smoothly curved to deflect the separated oil radially outward.

In still another embodiment of the invention, the oil grooves have ends opening into spline grooves, formed in the inner circumferential surface of the rotary member enclosure, so that the oil flowing into the oil grooves is drained through the spline grooves.

Preferably, the rotary member is a rotor for detecting the RPM whereas the rotary member enclosure is an automatic transmission casing, and the oil separating means is formed to direct the separated oil into the spline grooves formed in the inner circumferential surface of the automatic transmission casing.

In another embodiment of the invention, the rotary member is a parking gear whereas the rotary member enclosure is an automatic transmission casing, and the oil separating means includes spline grooves formed in the inner circumferential surface of the automatic transmission casing.

In yet another embodiment of the invention, the rotary member is a parking gear having teeth in its outer circumference, and the oil separating means includes a deflecting projection formed on a parking brake, which has a pawl for selectively meshing with the teeth. The deflecting projection, like the ridges of the previous embodiment, extends sufficiently close to the outer circumference of the rotary member to come into contact with the oil film or layer adhering to the rotary member.

In still another embodiment of the invention, the rotary member is a parking gear having teeth around its outer periphery, and the oil separating means includes a bracket fixed on an automatic transmission casing and having a leading end in sufficiently close proximity to the outer circumference of the rotary member to contact and remove oil adhering thereto.

BRIEF DESCRIPTION OF THE DRAWINGS

The invention will be described with reference to the drawings in which.

DESCRIPTION OF THE PREFERRED EMBODIMENTS

Preferred embodiments of the invention will now be described with reference to the accompanying drawings.

Figure 1:
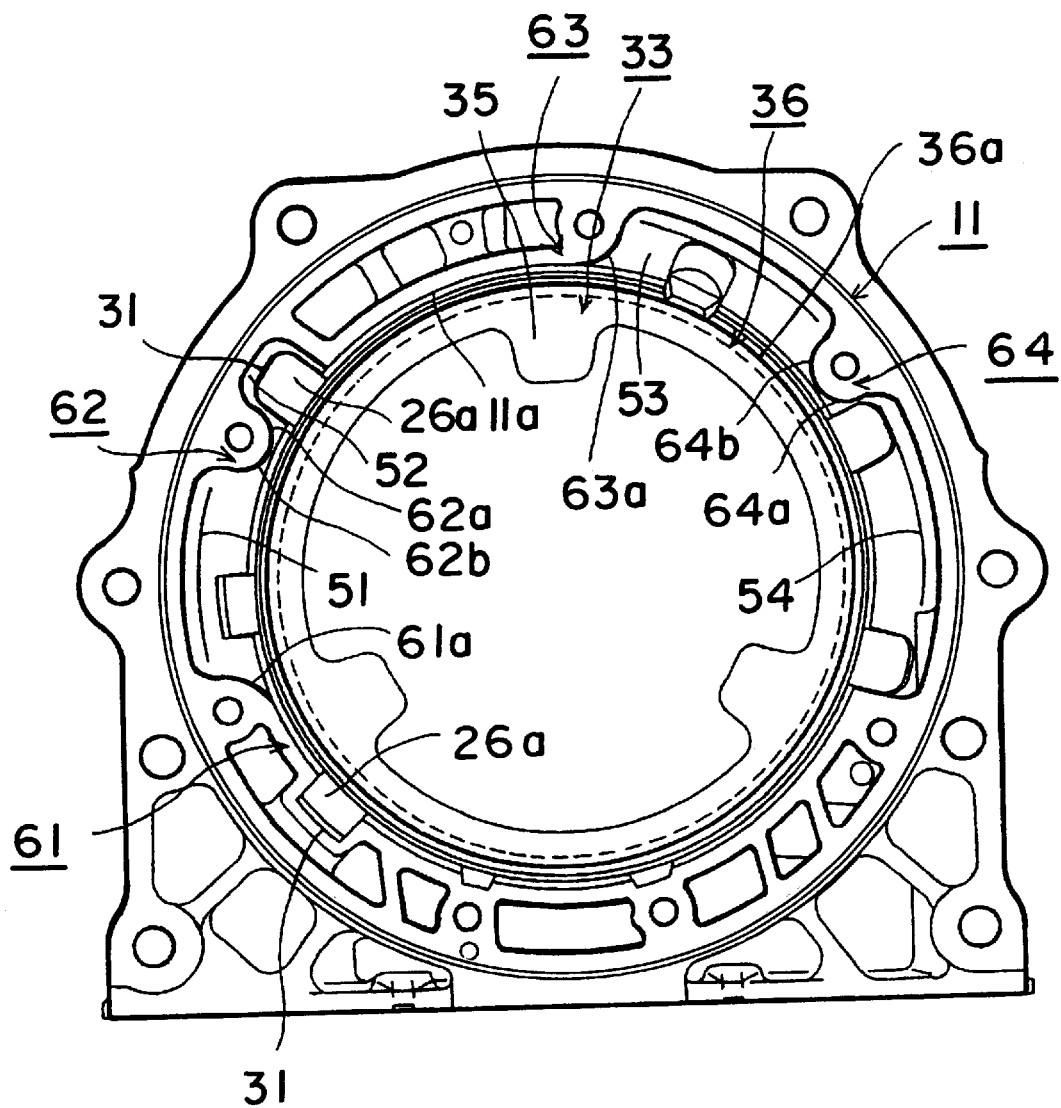
FIG. 1 is a sectional view showing an essential portion of an automatic transmission according to a first embodiment of the invention.
Figure 2:
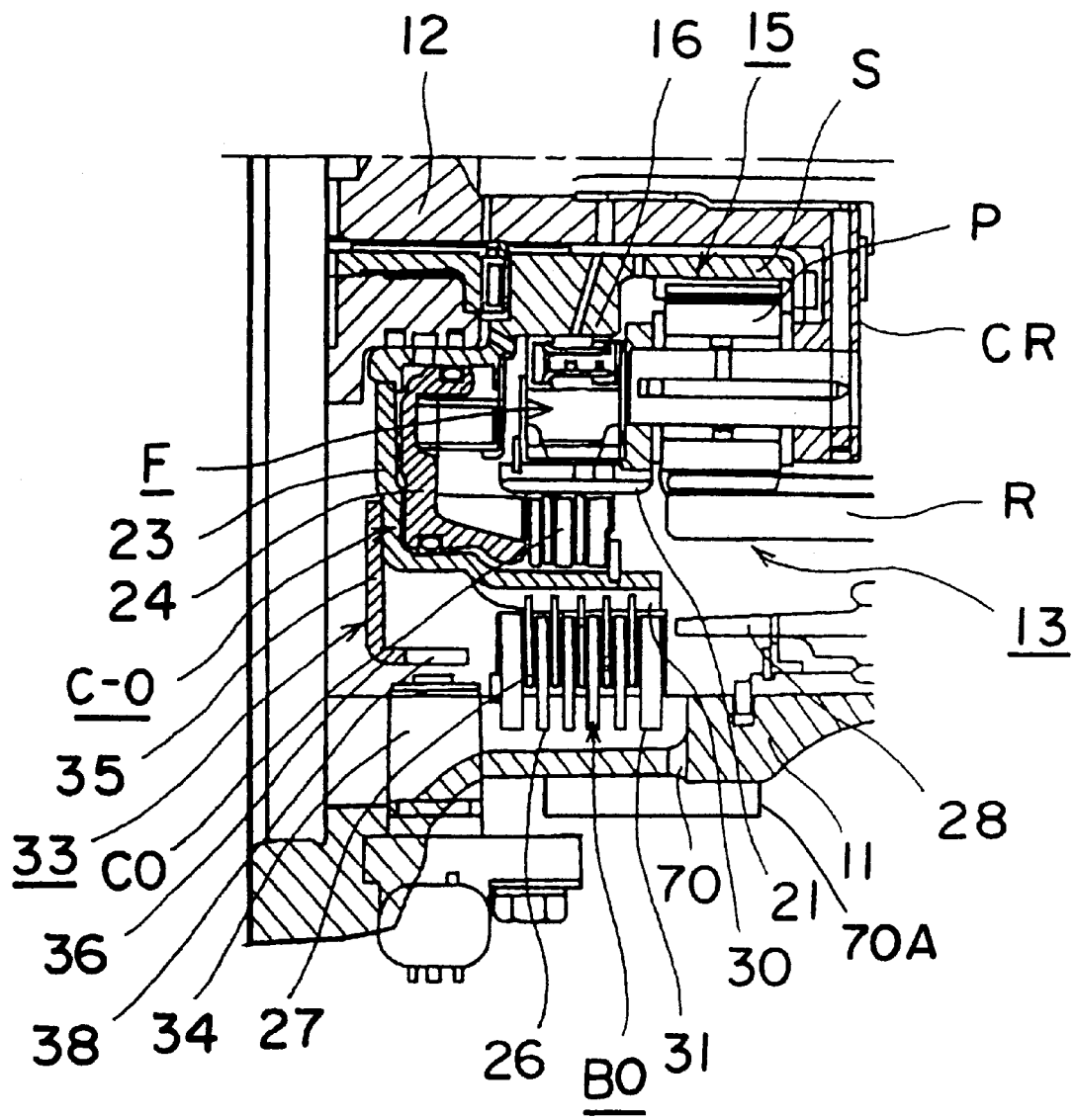
FIG. 2 is a side elevation of the casing of the automatic transmission according to the first embodiment of the invention.

A first embodiment is shown in FIGS. 1 and 2 wherein reference numeral 11 designates an automatic transmission casing serving as a rotary member enclosure, and numeral 12 designates an output shaft which is connected at its front end (the left-hand side in FIG. 2) to the torque converter (not shown) so that rotation is transmitted thereto from the torque converter. A planetary gear unit 13 for overdrive is composed of a ring gear R, a sun gear S, a pinion P meshing with the ring gear R and the sun gear S, and a carrier CR rotatably supporting the pinion P. The carrier CR is located at the rear end (as located at the right-hand end in FIG. 2) of the output shaft 12 and is integral with the output shaft 12.

The output shaft 12 rotatably supports a sleeve 15 on its outer circumference for rotation relative thereto. The sun gear S is integrally formed at the rear (the right-hand end in FIG. 2) of the sleeve 15, and the inner race 16 of a one-way clutch F is integrally formed at the front end (the left-hand side in FIG. 2) of the sleeve 15.

On the outer circumference of the front end of the carrier CR, there is fixed a ring 21 which is splined to the outer race 17 of the one-way clutch F.

A clutch drum 23 is fixed to the outer circumference edge of the sleeve 15 and a fourth clutch C0 is arranged between the clutch drum 23 and the ring 21. A piston 24 is reciprocally arranged in the clutch drum 23 so that it forms a hydraulic servo C-0 together with the clutch drum 23. As a result, the fourth clutch C0 can be applied by feeding the oil pressure to the hydraulic servo C-0 to move the piston forward (i.e., rightward in FIG. 2) and can be released by draining the oil from the inside of the hydraulic servo C-0 to move the piston 24 backward (i.e., leftward in FIG. 2).

Between the clutch drum 23 and the automatic transmission casing 11, is arranged a fourth brake B0, which can be applied by feeding oil pressure to its hydraulic servo B-0 (not shown) and released by draining the oil from the hydraulic servo B-0.

The fourth brake B0 is formed of a plurality of outer thin plates 26 splined to the automatic transmission casing 11, and a plurality of inner thin plates 27, splined to the clutch drum 23 and alternating with the outer thin plate 26. When oil pressure is fed to the hydraulic servo, piston 28 is moved forward (i.e., leftward in FIG. 2) to push against the outer thin plate 26 furtherest to the right. As a result, the fourth brake B0 is applied.

The outer circumference of the clutch drum 23 is splined with a plurality of spline grooves 30, and the inner circumference of the automatic transmission casing 11 is splined with a plurality of spline grooves 31. The outer circumference of each of the outer thin plates 26 has splines 26a mating with the spline grooves 31, as shown in FIG. 1. The inner circumference of each of the inner thin plates 27 also has splines (not shown) mating with the spline grooves 30.

In order to lubricate and cool the foregoing rotary members, oil is reserved in an oil pan, which is located below the automatic transmission casing 11 and which serves as an oil reservoir 70A, and the oil is drawn out of the oil pan by an oil pump (not shown) and fed to the individual rotary members. The oil, having lubricated and cooled the individual rotary members, is separated therefrom by centrifugal force and drops by gravity into the oil pan wherein it is collected.

In order to control the automatic transmission, the RPM transmitted from the engine to the torque converter is detected. For this RPM detection, an annular rotor 33, composed of a planar portion 35 and a cylindrical portion 36, axially extending from the outer circumferential edge of the planar portion 35, is fixed as a rotary member on the clutch drum 23, and an electromagnetic sensor 34 is arranged to face the outer circumference of the cylindrical portion 36. Incidentally, a plurality of slits 38 are formed in the cylindrical portion 36.

The rotor 33 is in the vicinity of the front end of the automatic transmission casing 11 and is provided with a constant spacing between the outer circumference 36a of the cylindrical portion 36 and the inner circumference 11a of the automatic transmission casing 11.

The oil for lubricating and cooling the rotor 33 adheres to the outer circumference 36a of the cylindrical portion 36, resisting separation therefrom by centrifugal force, as its viscosity rises and its fluidity lowers at low temperatures. This phenomenon reduces the amount of oil recovered in the oil pan so that the level of the oil surface drops.

In order to remove the oil left on the outer surface 36a of the cylindrical portion 36, therefore, oil separating means is provided on the inner circumference 11a of the automatic transmission casing 11.

In this first embodiment, more specifically, in the vicinity of the front end the automatic transmission casing 11 are provided plural axially extending oil grooves 51 to 54 around its circumference, corresponding to the spline grooves 31 and alternating with ridges 61 to 64. The ridges 61 to 64 are smoothly curved at their leading edges 61a to 64a, i.e. leading in clockwise (FIG. 1) rotation of the rotor.

The axially extending ridges 62 and 64 are also smoothly curved at their trailing edges 62b and 64b, (upstream side) relative to the clockwise rotation of the rotor 33. In order to provide communication between the interior of the automatic transmission casing 11 and the oil pan, a communication hole 70 is provided with one end opening into the spline groove 31.

As a result, some of the oil, left on the outer circumference 36a of the cylindrical portion 36, and which might otherwise be carried along the inner circumference 11a of the automatic transmission casing 11 by the rotation of the rotor 33, is deflected radially outward at the curved edges 61a to 64a due to its physical characteristics, most notably, surface tension. The oil then flows axially in the individual spline grooves 31 and drops from the end faces of the spline grooves 31 due to its own weight, i.e. by gravity, so that it is drained through the communication hole 70, formed in the bottom portion of the automatic transmission casing 11, into the oil pan wherein it is collected (as shown in FIG. 2). Of course, it is possible to form the communication hole 70 at a location other than that shown.

As a result, the amount of oil left on the outer circumference 36a of the cylindrical portion 36 is reduced so that more oil is recovered in the oil pan to prevent the level of the oil surface from lowering.

Since no more oil than necessary need be stored in the oil pan, not only the cost but also the frictional loss of the oil itself can be reduced to improve the efficiency of the automatic transmission. Further the oil neither deteriorates nor undergoes aeration and therefore retains its lubricating and cooling capabilities.

Since the oil is drained axially along the spline grooves 31, no special structure (passage) is required for its drainage. Thus, the cost can be lowered.

Figure 3:
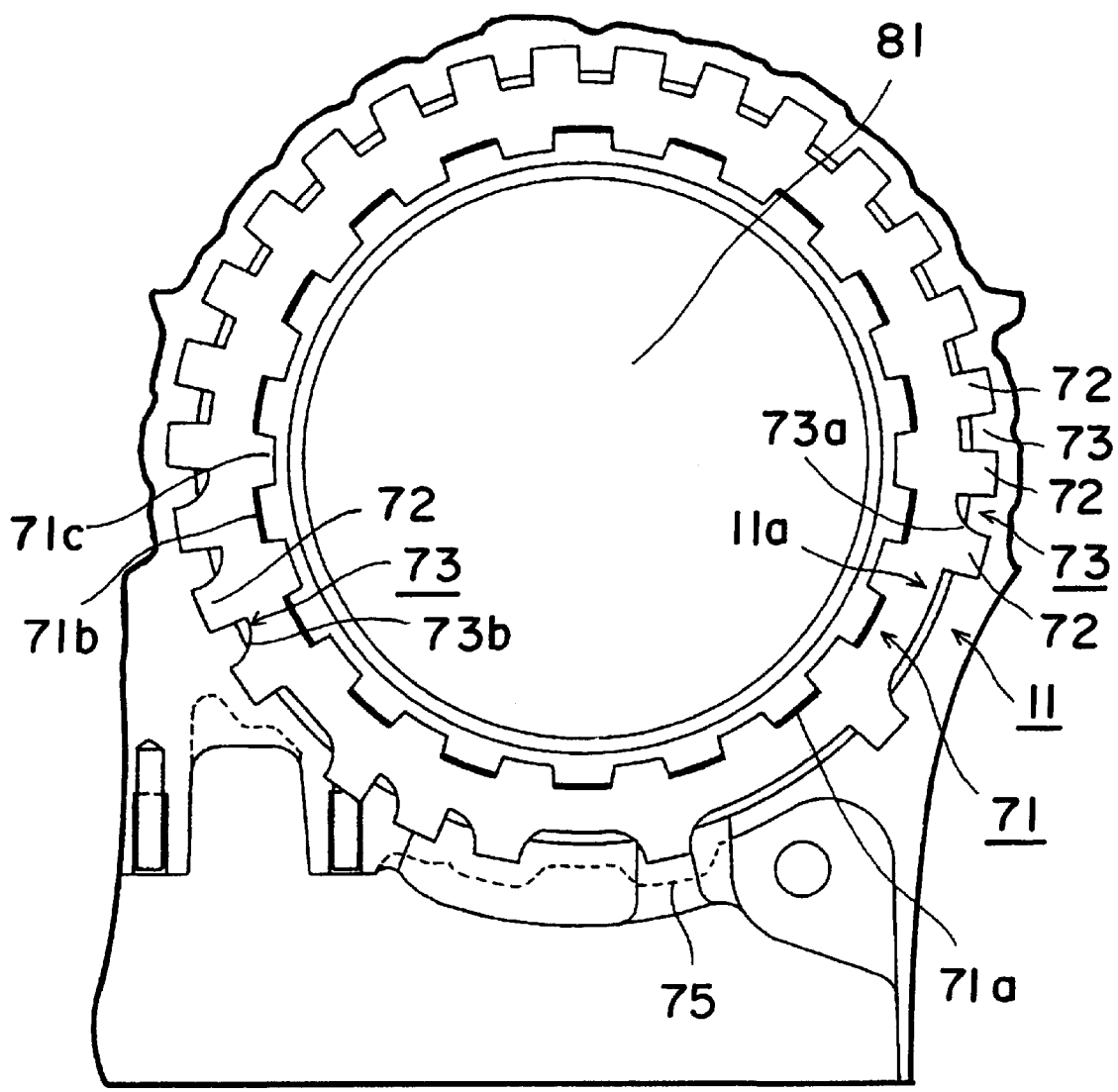
FIG. 3 is a cross-sectional view showing arrangement of a parking gear according to a second embodiment of the invention.
Figure 4:
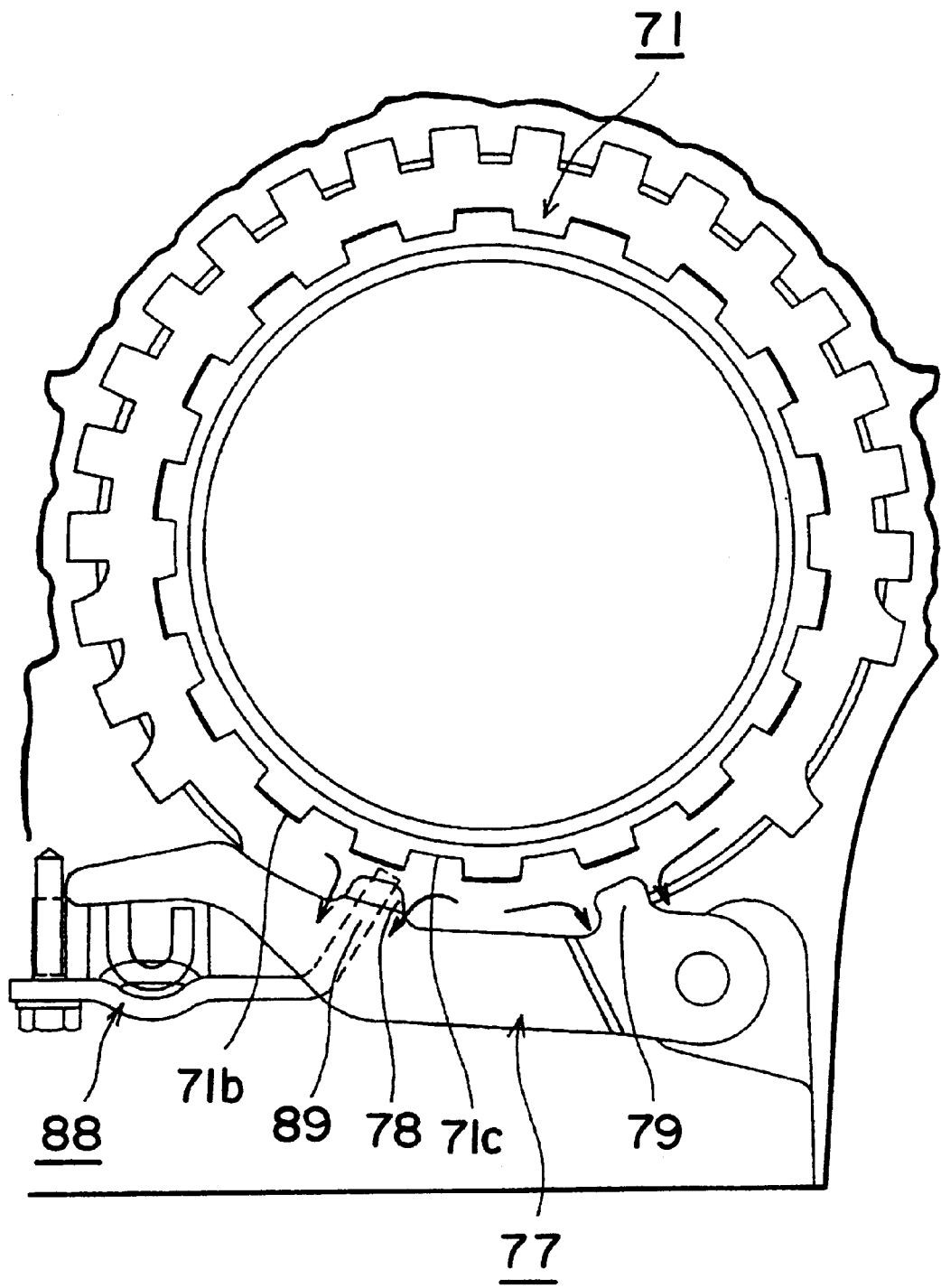
FIG. 4 is a diagram showing a state in which a parking pole is arranged according to the second embodiment of the invention.

FIGS. 3 and 4 show a second embodiment and, in particular, arrangement of a parking gear and a parking brake.

In this second embodiment, automatic transmission casing 11 serves as the rotary member enclosure, and a parking gear 71 as the rotary member which is arranged on the output shaft 81, rotatably relative to the automatic transmission casing 11. A plurality of gear teeth 71b and spaces 71c are alternately formed around the outer circumference of the parking gear 71. A parking brake 77 is pivotally supported on the automatic transmission casing 11, and carries a pawl 78 which is adapted to be selectively engaged within the gear spaces 71c.

When the driver operates the not-shown shift lever to select the parking range, the parking brake 77 is pivoted to bring the the pawl 78 into mating engagement within a space 71c to thereby lock the output shaft 81.

The parking gear 71 is fixed on the output shaft 81 so that it is turned clockwise in the drawing, when the vehicle runs in reverse. Conventionally, the oil, having lubricated and cooled the individual rotary members of the automatic transmission, adheres to the outer circumference 71a of the parking gear 71. Since the oil becomes more viscous and less fluid at the lower temperature, however, it resists the centrifugal force and remains on the outer circumference 71a. As a result, the amount of oil recovered in the oil pan (as the oil reservoir) is reduced to lower its level.

Thus, oil separating means are formed on the inner circumference 11a of the automatic transmission casing 11, facing the outer circumference 71a of the parking gear 71 and located upstream of the parking brake 77 in the rotational direction (clockwise in the drawings) of the parking gear 71 in forward running, and upstream of the parking brake 77 in the rotational direction (counter-clockwise in the drawings) of the parking gear 71 in reverse.

In an arc around the parking gear 71, a plurality of spline grooves 72 are formed with ridges 73 inbetween. End portions 73a and 73b are located at the ends of the arc and, are smoothly curved.

A hole 75 is formed in each groove 72 for providing communication between the interior of the automatic transmission casing 11 and the oil pan.

As a result, some of the oil, having adhered to the outer circumference 71a of the parking gear 71, is separated and is carried along the inner circumference 11a of the automatic transmission casing 11. The characteristics of the oil such as its surface tension cause it to be deflected radially outward at the end portions 73a and 73b so that it adheres to and flows along the curved faces. After this, the oil flows axially along the individual spline grooves 31 and drops from the end faces of the spline grooves 31 by its own weight (gravity) so that it is drained from the interior of the automatic transmission casing 11 through the communication hole 75 formed in the bottom portion of the automatic transmission casing 11, and is recovered in the oil pan.

A deflecting projection 79, serving as the oil separating means, extends toward the parking gear 71 from the parking brake 77 and is located adjacent the communication hole 75. As a result, some of the oil adhering to the outer circumference 71a of the parking gear 71 and carried along the inner circumference 11a of the automatic transmission casing 11 by the rotation of the parking gear 71, is separated and deflected radially outward and guided into the communication hole 75 by the deflecting projection 79. In this case, the deflecting projection 79 diverges toward its leading end to better guide the oil.

A bracket 88 located adjacent the pawl 78 of the parking brake 77, is fixed to the automatic transmission casing 11 and supports the parking rod (not shown). The leading end 89 of the bracket 88 is projected toward the parking gear 71. As a result, some of the oil, collected off of the outer circumference 71a of the parking gear 71, is deflected radially outward and separated by the leading end 89 of the bracket 88. Thus, bracket 88 also serves as oil separating means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission comprising:

at least one rotary member presenting an outer circumferential surface with adhering oil;

a rotary member enclosure enclosing said rotary member and defining an interior bounded by an inner circumferential surface surrounding said rotary member;

an oil reservoir arranged below said rotary member enclosure for collecting and reserving the oil;

oil separating means for separating the adhering oil from the outer circumferential surface of said rotary member, said oil separating means including a plurality of ridges defined between a plurality of oil grooves formed in said inner circumferential surface, said ridges extending into sufficiently close proximity to the outer circumferential surface of said rotary member to contact and separate the adhering oil from the outer circumferential surface of said rotary member and at least a portion of said plurality of ridges each presenting a smoothly curved edge downstream relative to a direction of rotation of said rotary member; and spline grooves formed in said inner circumferential surface of said rotary member enclosure, each spline groove opening at one end into one of said oil grooves so that the oil having collected in said oil grooves is drained through said spline grooves.

2. An automatic transmission according to claim 1, wherein said oil separating means deflects the separated oil radially outward.

3. An automatic transmission according to claim 1, wherein said rotary member enclosure further includes a communication hole for providing oil flow from the interior into said oil reservoir.

4. An automatic transmission according to claim 1, wherein said rotary member is a rotor opposed to a detector for detecting its RPM, and wherein said rotary member enclosure is an automatic transmission casing having said spline grooves axially extending therein.

5. An automatic transmission according to claim 1, wherein said rotary member is a parking gear, and wherein said rotary member enclosure is an automatic transmission casing.

* * * * *